Dec. 28, 1965   J. W. DRENNING   3,225,988
ULTRASONIC WEB POSITION DETECTOR AND ALIGNING MEANS
Filed Aug. 7, 1963   2 Sheets-Sheet 1
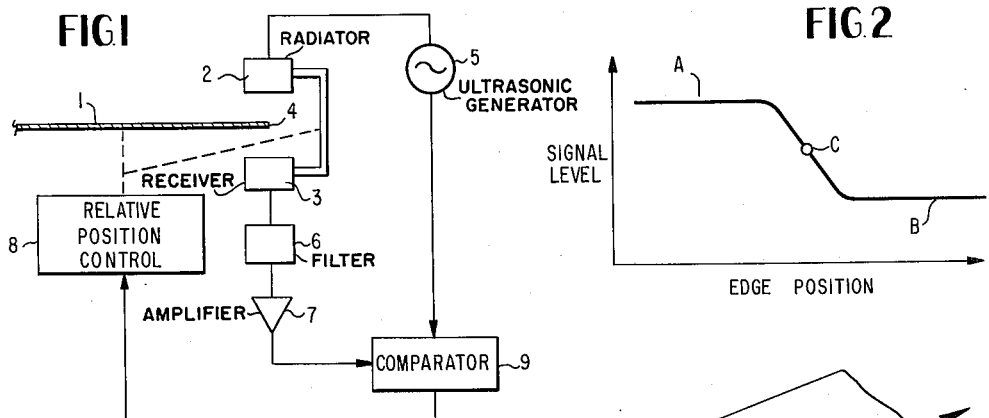
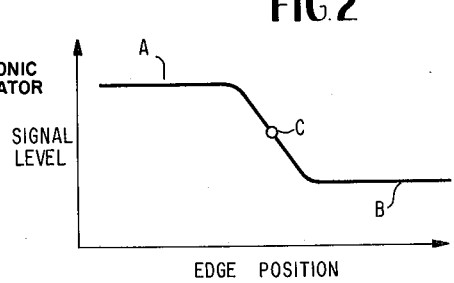
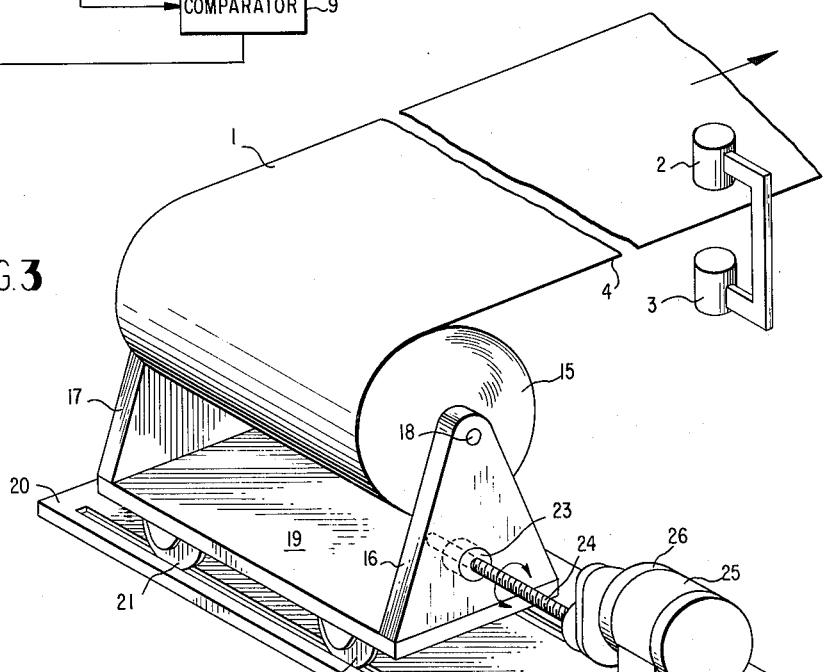
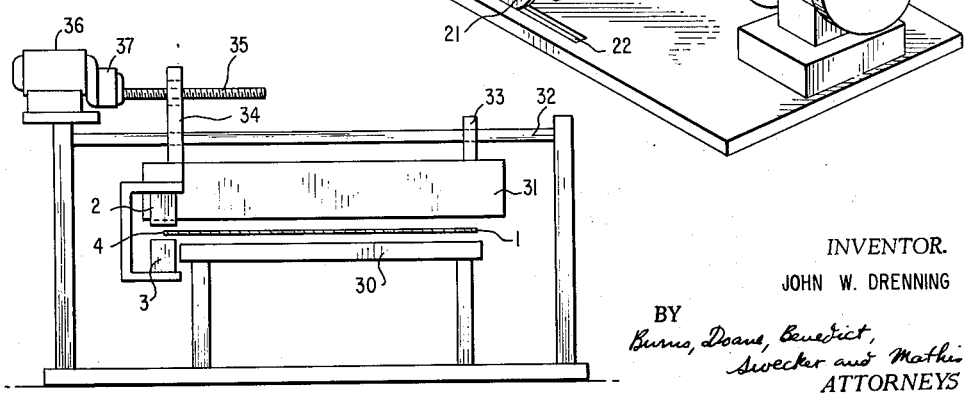
INVENTOR.
JOHN W. DRENNING
ATTORNEYS

United States Patent Office 3,225,988
Patented Dec. 28, 1965

3,225,988
ULTRASONIC WEB POSITION DETECTOR
AND ALIGNING MEANS
John W. Drenning, Baltimore, Md., assignor to Koppers Company, Inc., Pittsburgh, Pa., a corporation of Delaware
Filed Aug. 7, 1963, Ser. No. 300,497
5 Claims. (Cl. 226—19)

This invention is directed to the problem of determining the position of a traveling web. In fabricating and treatment processes, traveling web material is handled in great quantities, for instance in the manufacture of corrugated or plied paperboard. In other applications, traveling webs are employed as belts or conveyers for other material, such as a belt in a Fourdrinier machine for paper manufacture.

In this type of technology, the web material would preferably be fed along a predetermined path without lateral deviation from its desired position. It is, however, practically impossible to achieve these results under normal conditions. In many instances, the traveling web is of fragile material and cannot be rigidly constrained to the desired path of travel. In other instances, manufacturing irregularities in the web material itself cause it to change direction as successive portions of stock material are delivered.

It is consequently necessary to provide auxiliary positioning mechanisms for directing the traveling web material along the desired positional location, or, if the web material is permitted to deviate from a predetermined location, those deviations are sensed and operational equipment moved in accordance therewith to maintain it in a predetermined desired alignment with the traveling material.

This invention is directed to web handling apparatus including means for determining the position of a transversing web without physically contacting the web material. In the systems herein provided, an ultrasonic radiator is positionable adjacent the edge of the web and operates in combination with an ultrasonic receiver positioned to receive energy from the radiator at levels determined by the position of intercepting edge of the web relative to the radiator. The ultrasonic web detection system is operable with webs of any nature which absorb or reflect ultrasonic compressional atmospheric waves.

It is accordingly a primary object of this invention to detect the position of a traveling web without physically contacting the same.

It is a further object of the invention to provide web-handling apparatus with a position controlling means for maintaining an ultrasonic edge detector in predetermined alignment with the edge of a traveling web.

It is a further object of the invention to provide web-handling apparatus using an ultrasonic web edge detector to maintain the web in a predetermined lateral position.

Another object of the invention is to provide web-handling apparatus including operational means for processing a web as it is fed along a path wherein the operational means is maintained in predetermined lateral alignment with the web by means of an associated ultrasonic web edge detector.

A representative field of application of the present invention lies in the production of corrugated paperboard. In this manufacturing process, a traveling web of flat paper stock is first laid against and cemented to a corrugated liner sheet. In this operation, traveling webs of equal width are supplied to the equipment, and it is highly desirable that the sheets be assembled with their edges in exact alignment. The difficulties are multiplied in corrugated paperboard manufacture where the two ply is later glued to a second facing sheet for the production of rigid stock. To the extent that misalignment is present, the edges of the composite plied material must be trimmed to secure the desired product, and so far as this is necessary, there results an inherent loss of production. Consequently, prevention of lateral deviations from the desired paths of travel is very important in this type of equipment.

In the further handling of corrugated paperboard, the manufactured material is slit to form material of the desired widths, and scored where it is to be employed in box manufacture.

In these operations, which may be carried out when the edges are trimmed, it is often convenient to mount the operational equipment for lateral adjustment so that it follows deviations of the traveling web material from its desired path, because of engineering difficulties in directly controlling the latter as the multi-ply web passes through the equipment. For this purpose, an ultrasonic edge detector is used to follow the edge of the web and control the lateral position of the cutting, scoring, and edge trimming devices.

This invention will be described further with reference to the drawings, in which:

FIGURE 1 is a schematic showing of a system of the present invention;

FIGURE 2 is a qualitative showing of an operating characteristic of an ultrasonic edge detector;

FIGURE 3 shows web position control equipment useful in systems of the present invention;

FIGURE 4 shows apparatus for maintaining operational equipment in desired alignment with a moving web.

Figure 5:
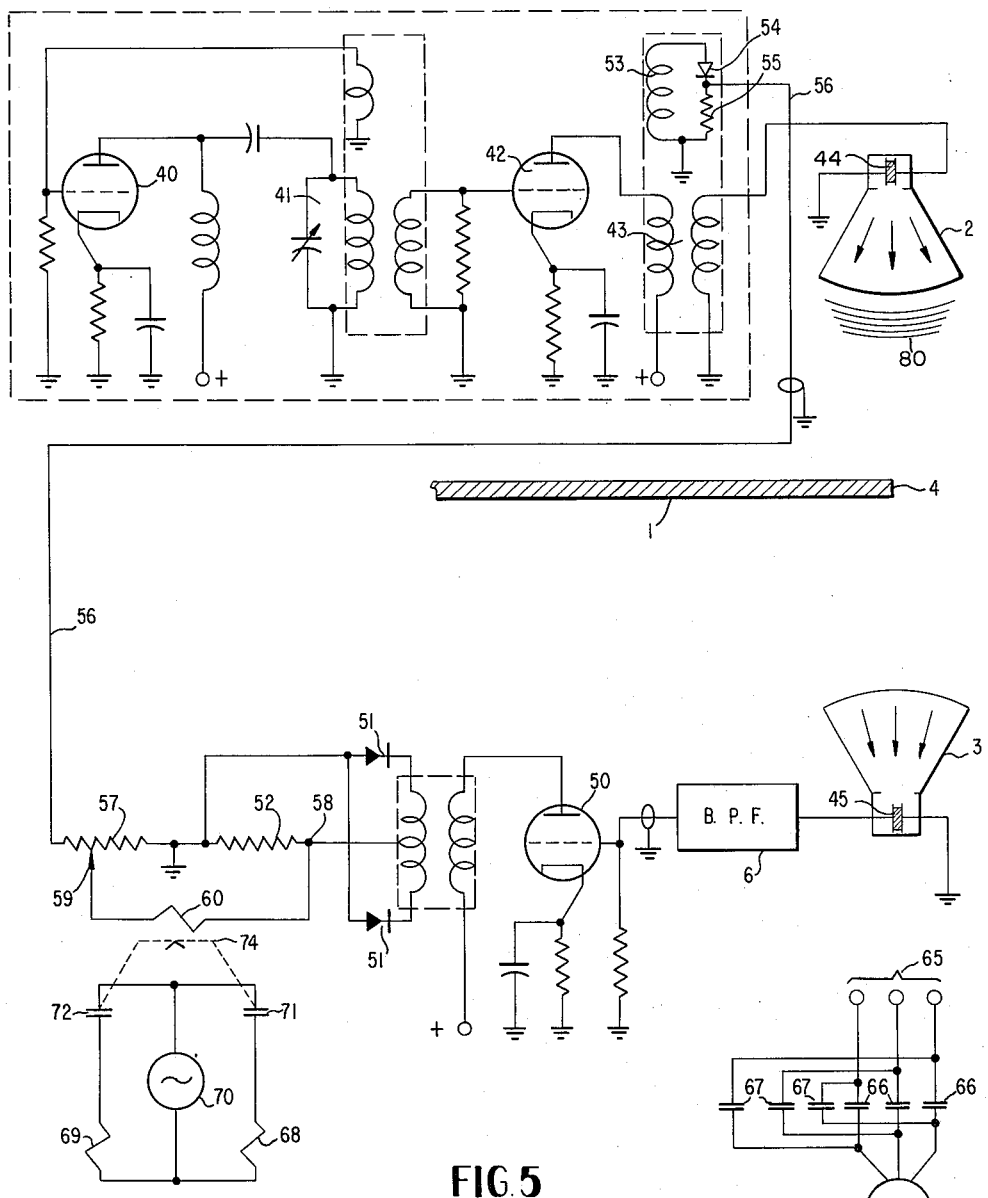
FIGURE 5 shows a circuit diagram for use in systems of the present invention.

The operating principles of the control system will be explained in connection with FIGURE 1, wherein the elements are schematically shown. The web section 1 shows the position of the web as it passes between an ultrasonic radiator 2 and a receiving transducer 3. These latter two components are normally mounted in permanent alignment and operate at low power levels. A beam of ultrasonic energy 80 is radiated by horn 2 under excitation of a single piezoelectric crystal 44. As shown, the beam 80 is steady with respect to the radiator components and thus has a static field intensity level pattern or configuration. The beam of ultrasonic energy 80 detected by receiver 3 represents an energy level which depends on the amount of the radiated energy absorbed or reflected by web 1, and thus depends on the position of the web edge 4 with respect to the transmission zone between the radiator and the receiver, that is, on the degree and direction of misalignment of the edge 4 with respect to radiator 2. As shown in FIGURE 2, when web 1 is outside of the detected transmission zone, in region A, high energy levels are present. When edge 4 of web 1 is moved through the beam received by receiver 3, the received energy level falls to a low value shown at region B of FIGURE 2. At intermediate positions of edge 4 within the beam of received energy, the energy level varies as a proportional function of the edge position and therefore provides an electrical output signal from receiver 3 varying directly with the position of edge 4 and accordingly giving a continuous reading of the displacement of the edge of the web with respect to the effective path between the radiator and receiver.

In the present system, servo means are provided to maintain the ultrasonic system in a predetermined position relative to web 1, so that receiver 3 supplies an output signal having predetermined value such as at point C shown on the sloped portion of the characteristic curve of FIGURE 2, intermediate portions A and B.

While the present system is primarily applied to traveling web material, obviously a continuous velocity in web 1 perpendicular to the plane of the sectional showing in FIGURE 1 is not a necessary prerequisite in utilizing the present invention.

In the system of FIGURE 1, an ultrasonic generator 5 is employed to energize radiator 2. Radiator 2 is operated at a frequency of 15,000 cycles or higher, above the normal range of human hearing. Consequently, the operation of the present system will not prove disturbing to equipment operators. The output from receiver 3 may be fed through a filter 6 for the purpose of eliminating undesired signals, since the acoustic sensitivity of the receiver may respond to and transduce other sounds present which might interfere with the normal operation of the control signal. The frequency band pre-selected by the filter, including the ultrasonic frequency supplied from generator 5, is amplified at 7 and employed to actuate a relative position control 8 to adjust the relative positions of web 1 and radiator 2. In the system as shown, output voltages of a value greater than C operate the system to bring the web and the radiator closer, while signal values less than C increase the separation between the web and the radiator.

In the specific system shown in FIGURE 1, an additional refinement is included to avoid the requirement that the system be adjusted to compensate for variations in the radiation intensity from the radiator 2. Such variations can result from line voltage disturbances, generator component aging or failure, and other factors. In order to compensate for these effects, a comparator 9 may be included in the control channel between receiver 3 and the relative position control 8. Comparator 9 receives a signal from generator 5 which varies with its effective output. Consequently, the signal from receiver 3 may be compared against a standard signal level determined by the output of generator 5 so that the control voltage supplied to the relative position control 8 is independent of generated amplitude values. In effect, the preferred system adjusts so that the operating point C of FIGURE 2 varies to maintain the desired spacing between the web and the radiator despite changes in signal level supplied from generator 5. Preferably, the output signal from comparator 9 is in the null range when the radiator 2 is in its desired alignment with web edge 4 of web 1, but supplies an output signal of a polarity and amplitude characteristic of the magnitude of the required spatial adjustment. The relative position control means 8 operates responsively to the signals supplied from the comparator. The relative position control means may include an electrical motor of the reversible single speed type, or a variable speed motor operating to correct the element spacing at a velocity which increases with the output signal from comparator 9.

The relative position of the web 1 and ultrasonic radiator 2 may be controlled conveniently either by adjustable means for directing the web, or means for positionally controlling the radiator in respect to the web, or both. In FIGURE 3 is shown an adjustably positionable means for directing the web along a path, relative to which the radiator and receiver are fixedly mounted.

The apparatus of FIGURE 3 includes a supply roll 15 of web material 1 mounted for rotation on a pair of trunnions 16 and 17. Roll 15 is axially journaled on shaft 18. The web material 1 is dispensed from roll 15 to web utilization apparatus which draws the same off in tension developed by motor driven pinch rolls or other draft means. In its passage to and through the utilization apparatus, web material 1 undergoes continuous wandering or deviations from the desired path. These deviations from the desired position can be determined by the control circuit operating in response to the signal generated in the ultrasonic receiving transducer 3.

One type of position control for correcting the position of the travelling web as it is determined by the ultrasonic detector is shown in the web supply apparatus of FIGURE 3. Here trunnions 16 and 17 carrying the supply roll 15 are mounted on a movable carriage 19 supported on base 20 by rollers 21 received in tracks 22. Rollers 21, therefore, permit supply reel 15 to be displaced along its axis of rotation, which in turn directs the traveling material 1 along its path to and in the utilization apparatus. In practice, however, due to the prevalently non-uniform characteristics of the web material, the same will not continuously follow the desired path, but wanders therefrom with attendant lateral deviation.

In order to maintain the material 1 in the desired position at a particular location, its position may be controlled by the lateral position of carriage 19 carrying the supply reel, an ultrasonic radiator 2 and receiver 3 may be permanently mounted, with such provision for adjustment as may be required by the associated equipment from time to time.

The position of carriage 19 on base 20 is controlled by lead screw 24 assembled in threaded engagement with insert 23 rigidly attached to trunnion 16 on carriage 19. Screw 24 is constrained against longitudinal movement, but may be energized for rotation by operation of a motor 25 which is coupled to screw 24 through reducing gear 26. As noted above, motor 25 is a reversible motor operating in response to a signal having a polarity and amplitude corresponding to the instantaneous operation of the system with respect to selected operating point C on the characteristic shown in FIGURE 2. A control system of the type disclosed in FIGURE 1 may be operated with a relative position control means as shown in FIGURE 3, to maintain the traveling web material 1 in the desired location with regard to its lateral position at the point of insulation of the ultrasonic radiator and receiver.

For other purposes, and particularly where operational means are employed for processing web material, it may well be impractical, because of engineering limitations, to maintain the web material in a fixed position with regard to the lateral wandering and deviation. Where this is the case, the ultrasonic edge detector may be used to maintain the operational process equipment in the desired alignment with the traveling material as it shifts position. Such an installation is shown in FIGURE 4.

In FIGURE 4, the traveling web material 1 passes over a suitable support plate 30, above which the operational process equipment 31 is diagrammatically shown. Equipment 31 may, for instance, be knives, saws, or scoring devices, which physically engage and operate on the material of traveling web 1. In the arrangement shown in FIGURE 4, the operational process equipment is mounted on track 32 for travel perpendicular to the direction of travel of the web material. Hangers 33 and 34 slidably engage track 32 for this purpose to support equipment 31. Hanger 34 extends upwardly above track 32 and is internally threaded to receive lead screw 35. As described in connection with lead screw 24 of FIGURE 3, this comprises a longitudinally constrained threaded shaft which may be driven through the requisite number of revolutions in either direction by motor 36 to which it is coupled through reduction gear 37. Thus, by the controlled operation of motor 36, equipment 31 may be adjusted laterally of the traveling web material.

In the arrangement shown in FIGURE 4, the ultrasonic radiator 2 and its opposed receiver 3 is attached to and moves with equipment 31. Where the arrangement of FIGURE 4 is employed as the relative position control 8 of the system of FIGURE 1, the radiator 2 is maintained in the desired alignment with edge 4 of material 1 as the same wanders about its mean average position. Again, this permits operational equipment 31 to carry out the necessary processes on the traveling web material 1 correctly positioned with respect thereto at all times as the latter shifts position.

Representative detailed circuitry for use in the system of FIGURE 1 is shown in FIGURE 5. Ultrasonic frequency power generator 5 employs a tuned plate oscillator circuit comprising triode 40 feeding tank circuit 41 inductively coupled to an output buffer amplifier comprising triode 42. The primary output circuit from amplifier 42 is formed by transformer 43 feeding piezoelectric element 44 of the ultrasonic radiator 3. This electromechanical transducer radiates a beam of compressional waves and is positioned adjacent to but in somewhat spaced relation from, an edge 4 of the traveling material 1. If desired, radiator 3 may comprise more complex additional horn elements, or lenses which may be designed to constrict and define the cross section of the beam of compressional energy directed toward receiver 3. Receiver 3 is a mechanical-electrical transducer for developing an electrical signal in response to received compressional wave energy. Its construction may be quite similar to that of radiator 2, in which case it will include a piezoelectric generating element 45 for supplying its output signal.

The output of ultrasonic receiver 3 will, in any case, vary with the position of web edge 4 with respect to the direct ultrasonic transmission channel from radiator 4 to receiver 3. While the radiator and receiver are normally rather highly directional and usually permanently aligned, this is not necessarily so. In the arrangement of FIGURE 4, for instance, the radiated ultrasonic energy could be uniformly distributed over a range on either side of the desired position of web edge 4 from a fixed radiator. Receiver 3 would then be mounted for movement with operational equipment 31 and the system, so arranged, would operate exactly as above described.

A conventional band pass filter 6 is included in the output signal channel receiving the signal from receiver for the purpose of excluding extraneous signals from the control system, but transmitting the ultrasonic frequency.

The ultrasonic frequency signal from receiver 3 is amplified in triode 50 and rectified by diodes 51 to develop a control voltage in resistor 52 which is proportional to the compressional wave intensity detected by receiver 3.

Returning now to the ultrasonic frequency generator, the latter's output circuit includes an auxiliary channel energized by winding 53 of output transformer 43. Secondary 53 feeds a series circuit comprising diode 54 and resistor 55, the latter returned to ground at the lower potential end thereof. The signal across resistor 55 is connected by lead 56, preferably shielded, to potentiometer 57, returned to ground in the common connection with resistor 52. Brush 59 may be set to provide the desired operating conditions.

In the circuit of FIGURE 5 it will therefore be understood that relay coils 60, connected to terminal 58 of resistor 52 and brush 59 of potentiometer 57, will be energized by an exciting voltage of a polarity and amplitude responsive to the relative amplitude of the output signal from receiver 3 considered with respect to a second voltage varying linearly with the output of the ultrasonic signal frequency generator. By suitable selection of circuit parameters and setting of brush 59, these respective voltages can be equalized so that zero energizing voltage is supplied to relay coil 60 when edge 4 of web material 1 is in the desired position of alignment with respect to the beam of ultrasonic energy received by receiver 3 from radiator 2. Operation of the circuit in these circumstances corresponds to an operating point such as C shown in FIGURE 2 on the slanted portion of the characteristic curve. It will be understood that should the power output of the ultrasonic frequency generator drop for some extraneous reason, while the exciting voltage across relay coil 50 is within the null region, that the comparator circuitry remains balanced by its inherent compensating action. Similarly, despite variations in power output of the ultrasonic frequency generator, control excitation voltages applied to coil 60 in this arrangement retain similar polarity and amplitude values for various relative positions of edge 4 of web material 3 with respect to the radiator and receiver, irrespective of the power level at which the system may be operating. Consequently, the control system of FIGURE 1 stably maintains the desired alignment of the edge of the web material with respect to the position of radiator 2. It will also be noted that failure of the oscillation generator, should it occur for any reason, merely renders the control circuit inoperative in whatever position it had attained at the moment of failure. Such a fail-safe characteristic is important in web handling apparatus and systems.

Where the use of an auxiliary secondary 53 is considered unnecessary, a predetermined adjustable D.C. reference potential may be connected to potentiometer 57.

The relative position control means includes reversible motor means responsive to the amplitude and polarity of the exciting voltage developed across terminal 58 and brush 59. This voltage, of a polarity and amplitude proportioned to the deviation of edge 4 from its desired position with respect to radiator 2, may, if desired, be employed to control a variable speed motor for adjusting the necessary position of the apparatus. In the system of FIGURE 5, however, a simplified circuit using a constant speed reversible motor is employed. Here, motor 25, as provided in FIGURE 3 (or at 36 in FIGURE 4) is a reversible three-phase motor powered from line 65 through two sets of selectively operable relay contacts 66 and 67. These sets of contacts are respectively controlled by energization of relay coils 68 and 69. Relay coils 68 and 69 are alternately selectively energizable from source 70 through contacts 71 and 72 controlled by energization of relay coil 60 of the comparator circuit. For this purpose, a polarized armature 74 is positioned for operation by the magnetic field generated by coil 60, and is designed so that contacts 71 and 72 are both open over a small range of low voltages around the zero value of energizing potential across terminal 58 and brush 59. Depending on whether the potential with respect to ground at point 58, which is determined by the occlusion of transmitted compressional wave energy by web material 1, is above or below the voltage amplitude at brush 59 (which is determined by the reference potential, armature 74 tends to close contacts 71 or 72, as the case may be. Thus, the circuit of FIGURE 5 operates to energize the motor 25 as shown in the equipment of FIGURE 3 to maintain the traveling web of material 1 in the predetermined desired position with respect to radiator 2 of that figure.

Similarly, the circuit of FIGURE 5, when used to energize motor 36 of FIGURE 4, will maintain operational process equipment 31 in the desired lateral alignment with traveling web material 1 shown in that figure as the latter wanders or develops lateral deviations from its mean average position.

While the ultrasonic edge detector equipment has been described above in representative applications for web handling apparatus, it will be understood that the scope of the invention is to be determined with respect to the appended claims.

I claim:
1. Web handling apparatus comprising means for supporting a web, ultrasonic radiator means positionable adjacent an edge of a web on said support in spaced relation thereto and operative to establish an ultrasonic energy field of static intensity level configuration; ultrasonic receiving means positioned to receive energy from the radiator means at levels determined by web edge position relative to the direct transmission channel between the ultrasonic means; actuator means for adjusting the relative position of at least one ultrasonic means and the edge of a web on said support; circuit means responsive to the ultrasonic receiving means operative to supply a control voltage of a magnitude and polarity dependent on the degree and direction of misalignment of the edge of the web with the direct transmission channel; and means for operating the actuator means responsive to the control voltage to maintain a predetermined alignment of said one ultrasonic means and the edge of a web on said support.

2. The apparatus of claim 1 further including oscillator means for energizing the ultrasonic radiator means and means for adjusting the control voltage in dependency an oscillator amplitude.

3. Web handling apparatus comprising means for supporting a web, ultrasonic radiator means positionable adjacent an edge of a web on said support in spaced relation thereto and operative to establish an ultrasonic energy field of static intensity level configuration; ultrasonic receiving means positioned to receive energy from the radiator means at levels determined by web edge position relative to the direct transmission channel between the ultrasonic means; actuator means for adjusting the relative position of at least one ultrasonic means and the edge of a web on said support; oscillator means for energizing the ultrasonic radiator; circuit means responsive to the ultrasonic receiving means operative to develop a unipolar voltage proportional to the output amplitude of the receiving means; and means for operating the actuator means in dependency on the magnitude and direction of the departure of the unipolar voltage from a reference voltage to maintain a predetermined alignment of said one ultrasonic means and the edge of a web on said support.

4. The apparatus of claim 3 further including means for adjusting the reference voltage in dependency on oscillator amplitude.

5. Web handling apparatus comprising means for feeding a web along a path, operational means for processing a web in said path; positioning means for adjusting the lateral position of the operational means relative to a web in said path; ultrasonic radiator means positionable adjacent an edge of a web in said path and operative to establish an ultrasonic energy field of static intensity level configuration; ultrasonic receiving means positioned to receive energy from the radiator means at levels determined by web edge position relative to the direct transmission channel between the ultrasonic means, at least one of said ultrasonic means being movable with the operational means; and means coupling the receiving means to the positioning means operative responsively to received energy to maintain said one ultrasonic means in a predetermined alignment with the edge of a web in said path whereby the operational means follows lateral deviations of such web.

References Cited by the Examiner
UNITED STATES PATENTS

| | | | |
|---|---|---|---|
| 1,791,288 | 2/1931 | Schweitzer | 250—219.1 |
| 1,945,981 | 2/1934 | Quinby | 242—57.1 |
| 2,220,736 | 11/1940 | Stockbarger. | |
| 2,527,208 | 10/1950 | Berry et al. | 73—67.6 |
| 2,827,246 | 3/1958 | Vanet | 242—56.1 |
| 2,862,384 | 12/1958 | Renaut | 73—67.6 |
| 3,077,656 | 2/1963 | Mahlo. | |
| 3,108,032 | 10/1963 | Carlson | 73—67.7 X |
| 3,108,727 | 10/1963 | Farber | 226—20 |

M. HENSON WOOD, JR., *Primary Examiner.*

RAPHAEL M. LUPO, ROBERT B. REEVES,
*Examiners.*